United States Patent [19]
Jetzt

[11] 3,793,784
[45] Feb. 26, 1974

[54] PROTECTIVE DEVICE FOR CUTTING MACHINES

[76] Inventor: Fritz Jetzt, Melanchtonstrasse 21,, Munich, Germany

[22] Filed: July 21, 1971

[21] Appl. No.: 164,679

[30] Foreign Application Priority Data
July 29, 1970  Germany ................. G 70 28 588.0

[52] U.S. Cl. ............................................... 51/269
[51] Int. Cl. ............................................ B25b 55/04
[58] Field of Search ... 51/269, 268, 170.1; 144/251; 143/159.6, 159.10; 30/276, 293

[56] References Cited
UNITED STATES PATENTS
| | | | |
|---|---|---|---|
| 3,382,578 | 5/1968 | Dobbertin | 51/268 |
| 2,819,570 | 1/1958 | Tocci-Gulbert et al. | 51/268 |
| 2,237,870 | 4/1941 | Smith | 30/276 X |

FOREIGN PATENTS OR APPLICATIONS
| | | | |
|---|---|---|---|
| 940,226 | 10/1963 | Great Britain | 51/268 |
| 168,409 | 6/1951 | Austria | 51/267 |

*Primary Examiner*—James L. Jones, Jr.
*Attorney, Agent, or Firm*—Silverman & Cass

[57] ABSTRACT

A safety device for the cutting disk of a manual cutting machine comprising a bottom part fastened to the spindle flange of the machine, which bottom part covers at least one circular surface of the disk, and a pot-like upper part which covers the other circular surface of the disk and has a flange covering the circumference of the disk, a radial recess being provided in the upper part and if need be also in the bottom part, the width of the recess being adjusted to correspond to the work piece, whereby the cutting disk is covered all around except for the recess which during operation of the machine is covered by the work piece.

5 Claims, 5 Drawing Figures

PATENTED FEB 26 1974 3,793,784

PROTECTIVE DEVICE FOR CUTTING MACHINES

BACKGROUND OF THE INVENTION

The invention relates to a protective device for the separation or cutting disk of a manual separating machine. Protective or safety devices are customary at these machines which expose approximately the lower half of the disk surface; they only protect against parts flying off upwardly. The machines are guided freely by hand for instance in the separation of steel profiles, whereby the disk is applied with the anterior downwardly rotating cutting edge at the rear side of the profile and is pulled forward cautiously. This operation requires considerable skill and a low feed speed in order to avoid any canting of the disk in the cut, as this could easily cause the breaking of the disk.

The innovation makes the high-speed separation method accessible to machining operations which heretofore could be performed by milling only. An example therefor is the separation of tube ends protruding from a surface as they are used particularly in the installation of gas and water piping systems, where the pipe conduits are laid before the walls are plastered or where they must be finished after the laying of the tiles proximal the wall surface. If for this operation a separating machine is used with the usual safety device, it is difficult to achieve a cutting surface precisely parallel with the wall surface. Moreover, in this case damage to the wall is almost inevitable.

DESCRIPTION OF THE PRIOR ART

A preferred case of application which also is represented in the drawing, is an installation method according to the German Patent 1,235,687, where, the thread bushing at first used as a sealing plug is screwed prior to the application of the finish plaster at a length protruding beyond the finish plaster surface to the conduit end and after the application of the finish plaster and worked in after the application of the finish plaster, remaining at the conduit end up to about the finish plaster surface in a shaving-removing manner according to this prior art, whereupon the threaded connection of the pipe or the fitting is screwed into the threaded sleeve. If the shaving-removing finishing is replaced by cutting off with the manual separating machine, the machining time is shortened considerably. If the threaded sleeve is made of a softer material, for example of plastic, and not of metal the safety device according to the innovation may be used if necessary, to good advantage also with a manual circular saw; it acts there with similar advantage as on a separating machine working with a separating disk.

SUMMARY OF THE INVENTION

According to the innovation the safety device for the separating disk comprises a bottom part to be fastened to the spindle flange of a manual separating machine which covers the separating disk at least on its one circular surface, a bottom part to be fastened on the flange and covering the separating disk at least on its one circular surface, and a pot-like top part covering the separation disk on its other circular surface and provided with an edge covering the circumference of the disk, whereby a radial recess is provided in the upper part and if necessary also in the bottom part, whose width is adjusted to the blank to be separated. That way the separating disk is covered on all sides save for the narrow recess which during the operation with the machine is covered by the blank. This offers the greatest protective effect imaginable; damages to the wall surface are then impossible.

In a prefereed embodiment of the innovation the upper part comprises an outer plane surface used to guide the machine. The machine is placed with this broad surface on the plastered or tiled wall and moved on it, whereby cantings are avoidable without any effort. The safe guidance makes it possible to operate the machine at high feed pressure, thus reducing the cutting time. Moreover, as a result of the safe guidance machines of a much simpler design may replace the separating machines of prior art where the disk is placed parallel to the longitudinal motor and apparatus axis and propelled via an angle gear. In this simpler design the separating disk is fastened directly on the motor shaft.

It is advisable to have the upper part of the protective device made adjustable as to its distance from the lower part. That way the protrusion of the cutoff pipe above the wall surface can be varied. It is recommended to fasten the separation disk on its shaft, which protrudes as little as possible above the disk surface in order to approach the wall surface with the cutting surface as closely as possible. It is advantageous to provide for protruding fastening parts a central opening in the upper part.

For a simple variation of the distance between upper and lower part, the lower part, too, has an edge and clamping screws or the like are provided in one of the two edges, and several axis-parallel adjustment slots are provided adjacent one another in circumferential direction, of differential length for the clamping screws.

In lieu of the axis parallel adjustment slots it also is possible to provide for each clamping screw an adjustment slot inclined in circumferential direction, so that during the turning of the upper part against the lower part a twisting effect is produced.

The radial recess in the lower part is then segment-shaped for the sake of expediency and designed flared by the twisting angle resulting from the adjustment range.

BRIEF DESCRIPTION OF THE DRAWINGS

The drawings represent an embodiment of the innovation in connection with a separating machine with an angle head.

FIG. 5 shows a section along V—V of FIG. 2 in enlarged scale, wherein the propulsion machine is omitted.

DESCRIPTION OF THE PREFERRED EMBODIMENT

Figure 2:
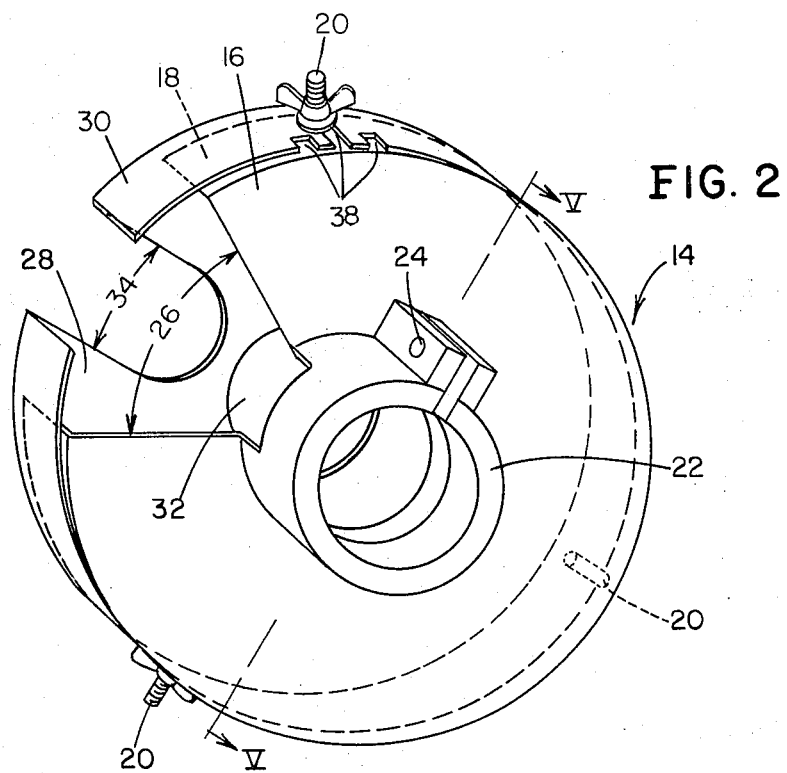
FIG. 2 shows the protective device 14 in perspective representation.

The protective apparatus 14 comprises according to FIGS. 2 and 5 a bottom part 16 which is substantially disk-shaped and has a cylindrical edge 18. Three clamping screws 20 are fastened at the edge, for example cast by an aluminum casting process in the production of the bottom part. The bottom part 16 also is provided with a clamping flange 22 by which it is clamped firmly on the spindle flange of the separating machine 10. The clamping screw to be operated in this connection and placed in the perforations 24 is not shown.

Figure 1:
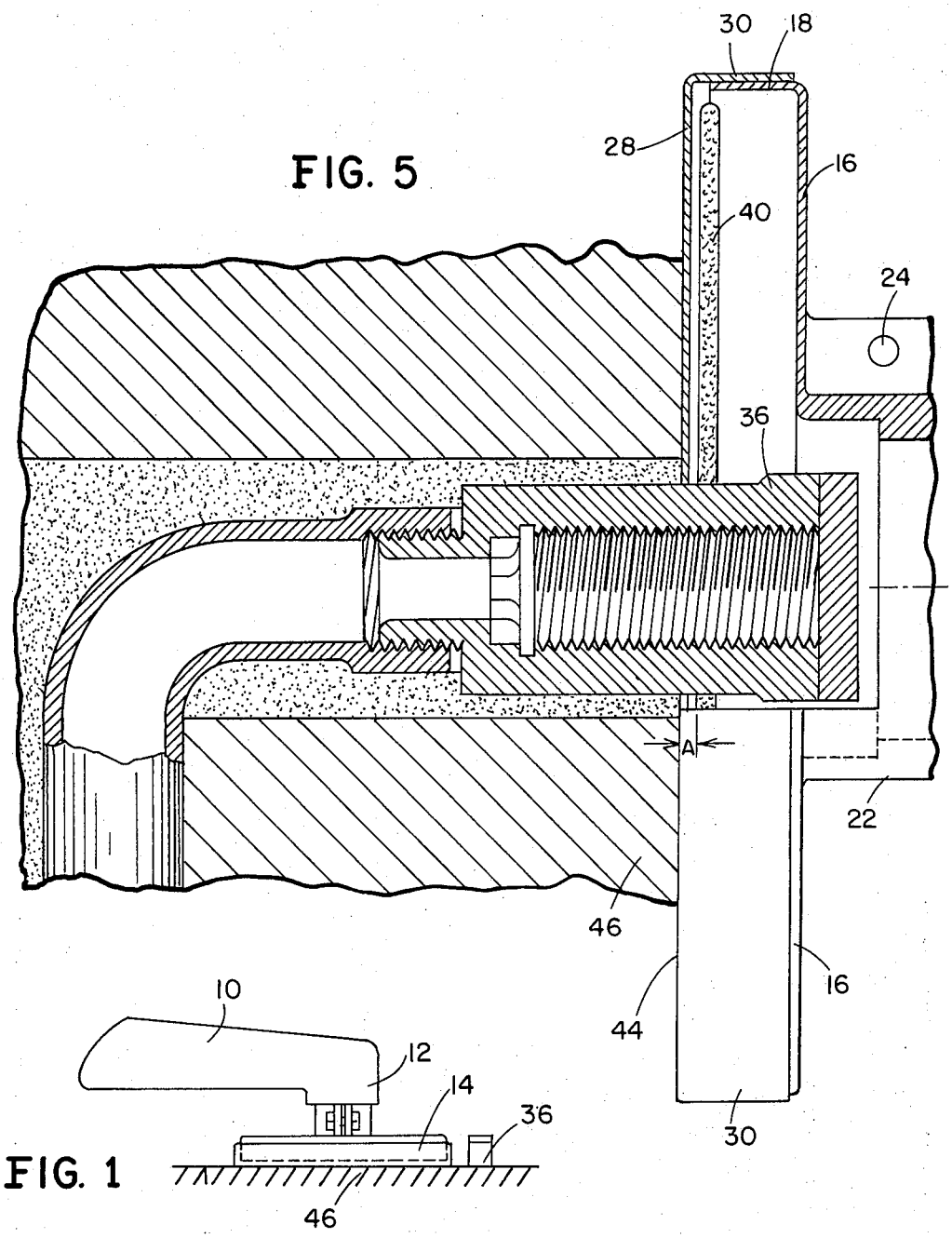
FIG. 1 shows a separating machine 10, whose angle head 12 bears the protective device 14.

An upper part 20 is fastened to the lower part 16 by means of the clamping screws 20, said upper part likewise being substantially disk-shaped and embracing with a cylindrical edge 30 the edge 18 of the bottom part 16. The upper part has a central perforation 32 and a radial recess 34 with substantially parallel edges the width of which is adjusted to the blank 36 (FIGS. 1 and 5) to be separated.

Figure 3:
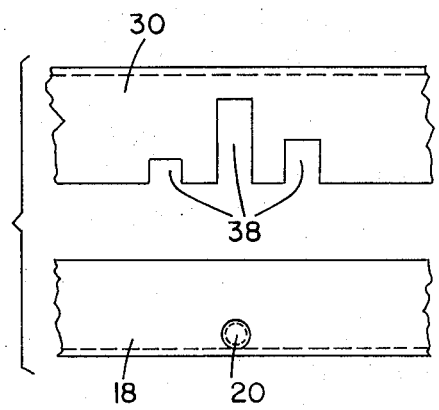
FIGS. 3 and 4 show the edges of the parts of the protective device in two embodiments.
Figure 4:
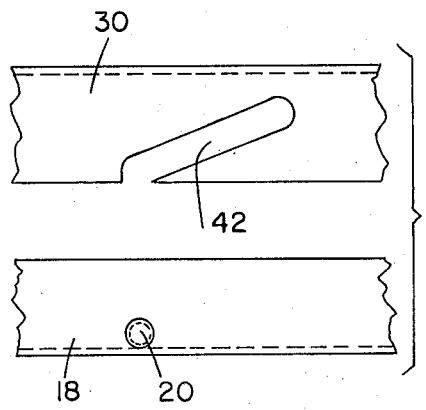

Three axis parallel adjustment slots 38 of different lengths are provided in the edge 30 according to FIG. 3, the clamping screws 20 entering thereinto upon placing the edge 30 of the upper part 28 upon the edge 18 of the lower part 16. As a result, the distance between upper part and lower part and of the separation disk 40 (FIG. 5) enveloped by both can be adjusted stepwise. The distance can be varied infinitely by adjustment slots 42 according to FIG. 4, which are likewise entered by the clamping screws 20 upon placement of the edge 30, if the distance is to be varied infinitely, by rotating upper and lower part against each other. According to the turning range the recess 26 is of wider design than the recess 34.

When applying the separating machine provided with this protective apparatus, said machine is placed with the outer surface 44 of the upper part 28 on the plastered or tiled wall 46 from which a sealing stopper 36 to be separated protrudes, for example, and it is displaced parallel with the wall (in FIG. 5 perpendicularly to the surface of the paper toward the viewer), so that the plug 36 enters the recesses 26 and 34. The separating disk 40 then separates the plug 36 at a distance A (FIG. 5) from the wall 46, said distance being reducible depending on the setting of the upper part 38 on the lower part 16 to 2–2.5mm. Thereby, the machine is provided on the one hand with a precise guiding at the wall parallel to the wall and the edges of the recess 34 and on the other hand a guide by the remainder of the plug 36 staying in the wall.

What is desired to secure by Letters Patent of the United States is:

1. A protective device for a separating disk having a first and second circular surface mountable on a spindle flange of a manual separating machine, said device comprising a bottom part to be fastened to the spindle flange, said bottom part constructed to cover at least the first circular surface of the separating disk, an upper part of a cup like configuration covering the second circular surface of the separating disk and having a first cylindrical flange covering the circumference of the disk, a radial recess in the upper part; the width of the recess being large enough to encompass a blank when the separating disk is moved towards the blank for separating the same, including means for adjusting the upper part in its distance from the bottom part, wherein the bottom part has a second cylindrical flange, radial clamping means being provided in one of the two cylindrical flanges, a plurality of axis-parallel adjustment slots for the clamping means being provided in the other cylindrical flange adjacent one another in circumferential direction, said slots being of different lengths.

2. A protective device according to claim 1 wherein the radial recess in the bottom part is segment-shaped and enlarged by an angle of rotation in accordance with the range of adjustment.

3. A protective device according to claim 1 wherein the radial recess in the bottom part is of a rectangular configuration and enlarged by an angle of rotation in accordance with the range of adjustment.

4. A protective device for a separating disk having a first and second circular surface mountable on a spindle flange of a manual separating machine, said device comprising a bottom part to be fastened to the spindle flange, said bottom part constructed to cover at least the first circular surface of the separating disk, an upper part of a cup like configuration covering the second circular surface of the separating disk and having a first cylindrical flange covering the circumference of the disk, a radial recess in the upper part; the width of the recess being large enough to encompass a blank when the separating disk is moved towards the blank for separating the same, including means for adjusting the upper part in its distance from the bottom part, wherein the bottom part has a second cylindrical flange, radial clamping means being provided in one of the two flanges, and a plurality of adjustment slots inclined in circumferential direction are provided in the other cylindrical flange.

5. A protective device according to claim 4 wherein the radial recess in the bottom part is segment-shaped and enlarged by an angle of rotation in accordance with the range of adjustment.

* * * * *